Feb. 28, 1933. C. DE LUKACSEVICS 1,899,239
FRICTION ELEMENT
Filed Dec. 15, 1928
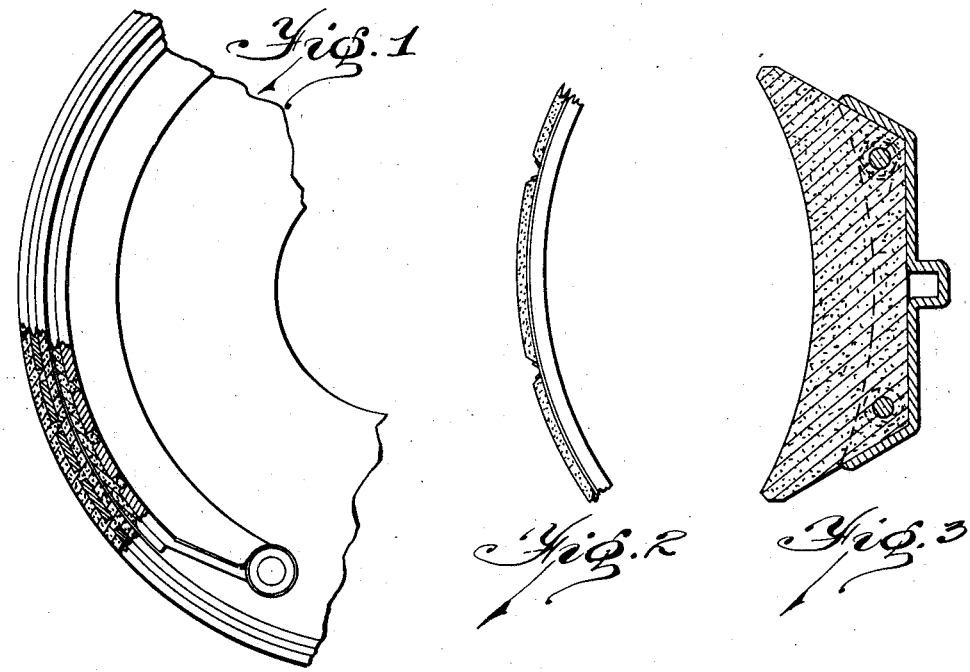
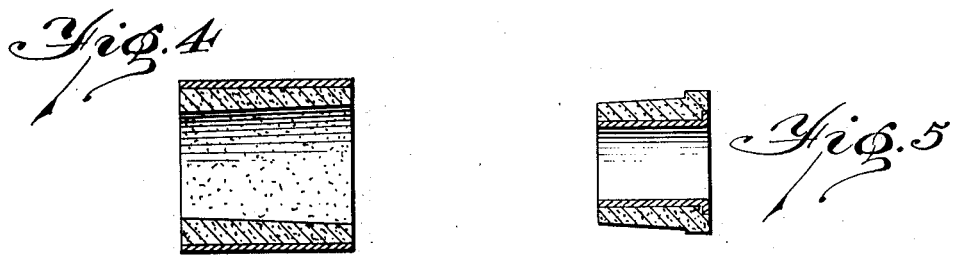
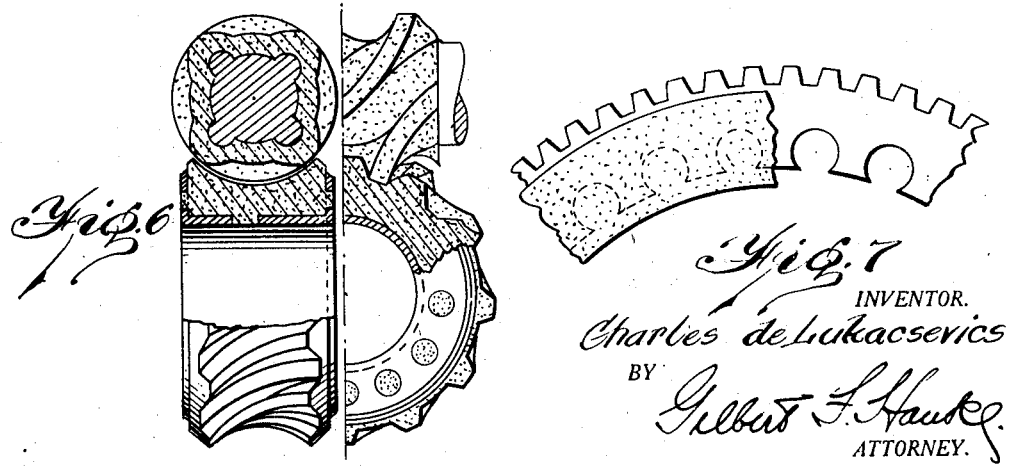
INVENTOR.
Charles de Lukacsevics
BY
Gilbert F. Hauke
ATTORNEY.

Patented Feb. 28, 1933

1,899,239

UNITED STATES PATENT OFFICE

CHARLES DE LUKACSEVICS, OF DETROIT, MICHIGAN, ASSIGNOR TO LILIAN BYRNE, OF DETROIT, MICHIGAN

FRICTION ELEMENT

Application filed December 15, 1928. Serial No. 326,160.

This invention relates to friction elements principally used in connection with braking apparatus for controlling the speed of moving machine elements and more particularly pertains to friction elements especially adapted for use as a brake material for automobiles and railway rolling stock.

Anyone familiar with this art will know that brake linings must be frequently adjusted if one is to be assured of having reliable brakes. The brake linings now most generally used, need to be constantly adjusted to take up the wear. Furthermore, constant application of the brakes causes excessive heat to be generated, and such excessive heat lowers the braking efficiency of the friction element; i. e., the frictional co-efficient is lowered. Most linings, with which I am familiar, are thus affected by heat.

In addition, I have found that most friction elements are readily affected by atmospheric changes, and as time goes on, they will age, becoming hard and brittle, and their frictional coefficient will gradually be decreased.

With the above problem in mind, it is the object of my present invention to remedy the dificulties as outlined above, by providing a friction element of unusually high tensile strength, toughness, and hardness that will withstand the severest strain and abuse to which it may be subjected without cracking or becoming damaged in any way.

Another object of my invention is to provide a friction element, in which the frictional coefficient remains practically constant under abnormal conditions as well as under normal driving conditions by providing a frictional element which is unaffected by temperature changes even though it may be subjected to dry friction under heavy load to such an extent that it becomes red or almost white hot.

A further object of my invention is to provide a frictional element of maximum efficiency by providing a frictional element whose texture is porous and which is capable of absorbing moisture or grit without decreasing the frictional qualities for which it was designed, since such moisture and grit will be evaporated or destroyed by the generated heat resulting from the ordinary use of the brakes.

A further object of my invention is to provide a friction element of low cost that lends itself readily to quantity production, by providing a material of maximum strength, durability, and texture, that may be used as a lining for steel and metal members, and which may be economically and permanently united or joined together.

A still further object of my invention is to provide a friction element that may be readily used to frictionally engage with cooperating metallic members without causing undue wear of said metallic members, but which retains a relatively high frictional-co-efficient by providing a friction element whose texture or composition permits the addition of a predetermined amount of graphite, which becomes embedded therein, and serves as a lubricating agent to prevent the wear of such metallic elements with which the friction element is arranged to contact.

In addition to the above objects, my purpose is to provide a material whose texture and composition is such that a greater relative percentage of graphite may be intermixed therewith to provide a sufficient amount of lubricant which permits the material to be utilized as oil-less or self-lubricating anti-friction elements, especially suitable for the manufacture of anti-friction bearings, worm or worm gears or other machine elements requiring a material of relatively high tensile strength, which is intensely hard and very tough and whose characteristics are unaffected by externally generated heat.

A still further object of my invention is to provide an artificial composition whose expansion when subjected to various predetermined heat treatments may be precisely controlled, thereby permitting the heat-treating of a metallic member about which this artificial composition is molded without causing the separation of the metal and the composition material. Such a separation would take place if the two elements, the metal and the artificial composition, were to expand unequally, but the expansion of my material may be controlled so as to cause it to expand the same as the metallic member to which it is attached, thus permitting the production of an artificial friction element reinforced by a metallic core or shell, to which the composition is firmly united.

For a more detailed understanding of my invention reference may be had to the accompanying drawing which illustrates various friction and anti-friction elements that may be manufactured from my new composition of matter, and in which:

Fig. 1 is a fragmentary view in elevation, partly in section, of a vehicle brake, showing the friction material united to a metallic brake shoe and to a metal drum.

Fig. 2 is a fragmentary view in elevation of a brake member in which the friction material is mechanically attached or clamped to a metal member.

Fig. 3 is sectional view of a brake shoe showing the friction element attached to a metal retainer by means of bolts.

Figs. 4 and 5 are sectional views of anti-friction bearings in which my material is incorporated.

Fig. 6 is a view of a worm and worm wheel constructed of my material.

Fig. 7 is a fragmentary view of a clutch member or disc faced with my friction element.

To form my new composition of matter I have discovered that I may combine certain kinds of clays with other elements and then subject the mass to a heat treating process for a relatively short period of time, which produces a friction material that is tough and strong, that possesses a high tensile strength, that will resist heat generation, and will have a constant frictional co-efficient at all times irrespective of the overheated condition, that is hard and resistant to wear, and which can be inexpensively and economically manufactured.

I have discovered that a composition as listed in the table below can be mixed together and heat treated to form a friction material having the above characteristics.

| | Per cent |
|---|---|
| Low-grade black clay, or graphite clay | 40 |
| Zirconium oxide | 15 |
| Agalmatolite, or magnesium silicate | 15 |
| Graphite clay | 5 |
| Magnesite | 10 |
| Kaolin | 3½ |
| Feldspar | 11½ |

These elements are finely powdered so as to pass a two hundred mesh sieve, compressed in dies to the shape and design desired and then dried. The molded article is then fired at a low temperature, the temperature being slowly raised to about 1000° F. within 3½ hours, then increased to 1400° F. in the next hour and held at that temperature for a duration of 12 hours. The temperature is then raised to 1650° F. and held there for about 4½ hours, then reduced to 1400° F. and held there for 3 hours. The furnace is then shut off and allowed to gradually cool off for about 10 hours. This will produce a semi-vitreous friction element of the hardness of about 7.5 to 8.0 Mohs' scale, having a tensile strength of about 8000 lbs. per sq. in. The product will be very tough (not brittle). The friction element will be porous so that it will absorb moisture or grit and its frictional surface will not wear or be affected even if the same becomes red hot. It will not crack or scale and will have a lineal expansion about equal to that of cast iron. In fact, this frictional element has been subjected for a period of twenty-four hours to a heavy load and 140 horse power in braking friction until its contacting surfaces become as hot as 900° F., and no measurable wear was apparent after such test, nor was there any crack or other deterioration in the friction surface, the braking effect was substantially constant during this test, with a variation of only about two to four pounds on a scale reading 800 lbs. of pull.

A slight change in the proportions as listed above was also quite satisfactory. The second composition is set out in the following table.

| | Per cent |
|---|---|
| Low grade black clay or graphite clay | 45 |
| Agalmatolite | 5 |
| Zirconium oxide | 25 |
| Magnesite | 5 |
| Kaolin | 5 |
| Feldspar | 15 |

This composition was powdered, compressed in dies and then dried as was done to the first mentioned composition. The molded product was placed in a furnace as before and the temperature increased slowly to 1000° F. within 3½ hours, then increased more rapidly in one hour to 1500° F. and held at 1500° F. for a period of 14 hours. The temperature was then raised to 1800° F. and held there for the next 5 hours, then dropped back to 1400° F. and held there for 4 hours. The furnace was then shut off and allowed to cool off gradually within about 10 to 12 hours.

This produced a semi-vitreous friction element of the hardness of about 8.5 Mohs' scale and having a tensile strength of about 9500 lbs. per sq. in. It is porous but somewhat denser than the article produced by the previous heat-treatment, yet it will absorb moisture or grit, will not chip or crack, and will have a frictional co-efficient substantially the same as that produced by the process as outlined previously. Its frictional surface will not be affected even if the same becomes white hot, and will have a lineal expansion equal to that of steel.

Thus it is obvious that the percentage of the ingredients may be slightly varied and the heat-treatment varied to some extent to effect allotropic changes in the finished product and to effect the lineal expansion as desired.

A discussion of the different ingredients which form my composition will enable those skilled in the art to more fully understand my invention.

I have found that most of the so-called "low grade" clays have a high percentage of iron oxide and manganese oxide, one of which has the following analysis:—

| | |
|---|---|
| $Fe_2O_3$ Ferric oxide | 29.94 |
| MgO Magnesia | 0.60 |
| MnO Manganese oxide | 9.73 |
| $SiO_2$ Silica | 41.43 |
| $Al_2O_3$ Alumina | 6.77 |
| $TiO_2$ Titania | 0.27 |
| $P_2O_5$ Phosphorus oxide | 0.88 |
| CaO Lime | 0.55 |
| $K_2O$ Potassium oxide | 1.21 |
| $Ma_2O$ Sodium oxide | 0.29 |
| Moisture at 105° C | 0.45 |
| Ignition loss $H_2O$ | 8.41 |

Another low-grade clay suitable for my purpose is called graphite fire clay which is formed of practically the same constituents, but contains approximately 30% of iron oxide, about 8% of manganese and about 50% of silica, the balance being similar to that set forth in the above analysis but of smaller percentages leaving about 6% for $H_2O$ loss on ignition.

These clays, I may define as the basic ingredient of the composition, and they serve to give body and cohesiveness to the composition due largely to the relatively high iron and manganese content. These clays when heat-treated or calcined become abnormally tough and have a low expansion. They tend to harden at a temperature of about 1400° F. to 1600° F. and mature to a semi-vitreous state within a period of about 14 to 16 hours. It may be obviously understood that there are any number of clays of somewhat similar analysis that are suitable for my purpose, these clays being commonly known as low-grade black clays. It is necessary, however, that these clays possess a relative high percentage of iron and manganese oxide.

From the aforegoing description of the two basic ingredients it is evident that while the black clays index of refraction is 1.200 to 1.400 the index of refraction of the zirconium oxide is 1.950, in other words, the refraction differences are such that at a neutral firing of 1600° F. they become semi-amalgamated in a manner that zirconium oxide remains dominant as to the outcome of the final product. In other words a neutral firing of 1600° F. produces such an intercombined hardening of the two materials that the result is a semi-vitreous porous and elastic composition that is tough (not brittle) and of unusually high tensile strength.

I have found that when these two intercombined basic ingredients are calcined and heat treated to about 1600° F. they become very tough and elastic, and not brittle as would be the case if they were fully refracted at a higher temperature. I have also found that the semi-vitreous porous condition can be maintained up to the point of 1950° F., and of a short duration lasting about eighteen hours, which would give a very satisfactory result.

I have also discovered that to alter the desirable refraction to be attained at different degrees of heat and of varied durations of time, various other silicates such as agalmatolite or magnesium silicate may be added to the composition. The agalmatolite is added to vary the desired hardness and porosity.

I use the feldspar as a neutralizing agent and binder.

I use kaolin as a fluxing agent, or as a second neutralizing agent to induce allotropic changes in the entire mixture.

The non-metallic minerals used in composition such as agalmatolite, magnesia silicate, magnesite—deadburned, are pacifying agents and are used more or less for the purpose of giving hardness to the ultimate product. They are also used as a filler while kaolin and feldspar are used as a binder as well as to affect allotropic changes as the case may demand.

It should be understood that the percentage of the ingredients of my composition may be slightly varied to effect allotropic changes and different lineal expansion as desired.

Also the heat treatment may be varied within certain limits depending upon what use the ultimate product is to be put, but it is never necessary to raise the heat higher than 1800° F. The maintenance of the medium heat before shutting off causes the maturing of the interior section or the core. The surface becomes fully matured at the maximum temperature; thus the ultimate product has a semi-cured core and a relatively hard surface surrounding it.

It should be understood that the compositions I have described may be molded to any desirable shapes for any type of friction devices for a great variety of uses, to either constitute or line therewith any friction member such as brake drums, brake shoes, clutches, members of friction drive devices, etc. as illustrated. But it should be understood that this product is to be used on both contacting surfaces of the friction device, as for example, the friction surface of a brake drum would be lined with this product as well as the friction surface of the brake shoe in order to attain satisfactory service.

When the plastic composition material is compressed in the molding dies, the dies may be heated for the purpose of driving off moisture. The molded product must be thoroughly dried before it is calcined. The product is calcined either in muffled furnaces or in an open fire furnace, but when calcined in the latter furnace the product must be placed in saggers.

I have discovered, that, because of the fact that it is possible to control the expansion of the material and that the temperature attained in the calcining process is below the melting point of iron or steel, I can mold this composition about iron or steel members, and insert the whole in the furnace. Various suitable forms of anchoring means may be utilized for keying the plastic material to the iron or steel members such as recesses or projections on the steel members. The heat used does not deteriorate the metallic member except that it might anneal it to a certain extent which is perfectly satisfactory. Thus the composition material when calcined will become securely united or attached to the metallic member, and will resist any strain, will not chip, crack or peel off from the metal.

I have discovered that this same composition material may be mixed with about 25% of graphite before being molded and calcined and heat treated in substantially the same manner and thus produce a friction element having an intensely hard surface, and having a frictional co-efficient of about 20% to 25% lower than when the graphite is not used, but of a greater frictional co-efficient than the present type of brake lining. This friction element in which graphite is used may be used to engage with metallic friction members without wearing the metallic member, due to the graphite providing sufficient lubrication to prevent such wear. The porous condition of the product permits the graphite to lubricate the contacting surface of the friction element.

This same composition when united with about 25% of graphite as described may be used in manufacturing anti-friction bearings such as cones, cups, tapered rollers, or balls instead of making them of steel. My product will have approximately the same strength of steel but will be much harder and will never anneal itself when subjected to excessive heat. Besides its production cost will be less than for metal bearings. If desired this material may be reinforced with steel, as shown in Figures 4, 5, and 6 of the drawing wherein the outside or inside of a tubular section may be lined with my material. In Fig. 6 the worm may be reinforced with a steel shaft and the worm wheel is shown as reinforced with a steel bushing.

I have also discovered that I may mix with my original composition about 60% to 75% of graphite and preferably increase the zirconium oxide content about 20% and obtain an ultimate product that may be used to manufacture oilless bearings that are very hard and tough, but not brittle, and which can replace the present conventional type of graphite and metallic mixtures. In fact my product will be far superior in quality, will have greater tensile strength and will show less wear. The incorporated graphite serves as an excellent lubricating agent, and the graphited composition will not attack the metal shaft due to the presence of graphite, yet the hardness of the body will prevent the wearing of the bearing. The pores of the composite bearing arrest and confine constantly the graphite and will not permit the graphite to escape regardless of how heavy a load is applied, but will continuously keep the pores filled with graphite.

In experimenting with my new material, I have discovered that the plastic material can be sprayed on a metal base instead of being molded thereon. By this process I am able to provide a semi-vitreous enamel on any suitable metal base. By subjecting the product to a heat treatment similar to that carried out in curing the previously mentioned products, I find that the composition material will adhere very tenaciously to the metal base and will not be easily chipped off, nor will excessive high temperature affect the character of the enamel. If the temperatures to which my composition of material is subjected during the heat treatment are not sufficient to completely cure the composition, the clay-zirconium oxide composition is under calcined. Higher temperatures would decrease the adhesion between the composition material and the metal base, therefore a maximum temperature of 1800° F. will produce the best results.

From the foregoing description, it will be seen that I have provided a new composition of superior quality, of increased efficiency that may be manufactured at a lower cost, that may be produced more rapidly in larger quantities, and that has a much longer life than any other product now manufactured. In addition, my new composition retains its same characteristics irrespective of temperature and atmospheric changes which normally affect other frictional elements.

It may be obvious that various changes may be made in the composition or the heat treatment may be slightly varied without departing from the spirit of my invention.

I claim:

A composition friction element comprising a molded and calcined mixture containing approximately 45% black clay or graphite clay, 25% zirconium oxide, 15% feldspar and 5% each of agalmatolite, magnesite and kaolin.

In testimony whereof I have affixed my signature.

CHARLES DE LUKACSEVICS.